(12) United States Patent
Filippi et al.

(10) Patent No.: US 7,727,491 B2
(45) Date of Patent: Jun. 1, 2010

(54) PSEUDO-ISOTHERMAL CHEMICAL REACTOR FOR HETEROGENEOUS CHEMICAL REACTIONS

(75) Inventors: Ermanno Filippi, Castagnola (CH); Enrico Rizzi, Casnate con Bernate (IT); Mirco Tarozzo, Ligornetto (CH)

(73) Assignee: Methanol Casale S.A. (CH)

( * ) Notice: Subject to any disclaimer, the term of this patent is extended or adjusted under 35 U.S.C. 154(b) by 447 days.

(21) Appl. No.: 10/566,120

(22) PCT Filed: Dec. 21, 2004

(86) PCT No.: PCT/EP2004/014520

§ 371 (c)(1),
(2), (4) Date: Jan. 25, 2006

(87) PCT Pub. No.: WO2005/077519

PCT Pub. Date: Aug. 25, 2005

(65) Prior Publication Data

US 2006/0275190 A1    Dec. 7, 2006

(30) Foreign Application Priority Data

Feb. 12, 2004   (EP)   ................... 04003164

(51) Int. Cl.
*B01J 19/00* (2006.01)
(52) U.S. Cl. .............. 422/198; 422/200; 422/201; 422/211; 422/212
(58) Field of Classification Search ............... 422/198, 422/200, 211, 212, 201; 165/163
See application file for complete search history.

(56) References Cited

U.S. PATENT DOCUMENTS

| 5,762,887 | A  | * | 6/1998 | Girod et al. | .............. | 422/200 |
| 5,869,011 | A  |   | 2/1999 | Lee |   |   |
| 6,926,873 | B1 | * | 8/2005 | Filippi et al. | .............. | 422/198 |
| 6,939,520 | B2 | * | 9/2005 | Filippi et al. | .............. | 422/198 |
| 7,055,583 | B2 | * | 6/2006 | Filippi et al. | .............. | 165/145 |
| 7,104,314 | B2 | * | 9/2006 | Valensa et al. | .............. | 165/164 |
| 7,204,301 | B2 | * | 4/2007 | Filippi et al. | .............. | 165/157 |

FOREIGN PATENT DOCUMENTS

| DE | 855 258 C | | 11/1952 |
| DE | 39 16 337 A1 | | 10/1990 |
| EP | 0534195 | * | 3/1993 |
| EP | 1 221 339 A1 | | 7/2002 |
| EP | 1 279 915 | * | 1/2003 |
| GB | 1270568 | * | 4/1972 |
| WO | WO-94/12274 A | | 6/1994 |

OTHER PUBLICATIONS

Machine Translation—Abstact, Detailed Description EP0534195 published Apr. 1972.*

* cited by examiner

*Primary Examiner*—N. Bhat
(74) *Attorney, Agent, or Firm*—Akerman Senterfitt

(57) ABSTRACT

Pseudo-isothermal chemical reactor for heterogeneous chemical reactions comprising a substantially cylindrical shell closed at the opposite ends by respective bottoms, upper and lower, a reaction zone containing at least one catalytic bed and at least one tubular heat exchanger, intended to be crossed, along a predetermined direction, by an operating heat exchange fluid and embedded in said catalytic bed.

12 Claims, 6 Drawing Sheets

PSEUDO-ISOTHERMAL CHEMICAL REACTOR FOR HETEROGENEOUS CHEMICAL REACTIONS

CROSS-REFERENCE TO RELATED APPLICATIONS

This application is a §371 national stage of PCT/EP2004/014520, filed Dec. 21, 2004, which claims priority to European Patent Application No. 04003164.3, filed Feb. 12, 2004, both of which are hereby incorporated by reference.

Field of Application

The present invention, in its most general aspect, refers to a pseudo-isothermal chemical reactor for heterogeneous chemical reactions comprising a substantially cylindrical shell closed at the opposite ends by respective bottoms, upper and lower, a reaction zone defined in said shell for receiving a catalytic bed and at least one heat exchange unit supported in said reaction zone and comprising a plurality of heat exchangers.

Prior Art

It is known that for an optimal completion of exothermal or endothermal chemical reactions it is necessary to remove or, respectively, supply heat to the reaction environment so as to control its temperature in close proximity to a prefixed theoretical value.

It is also known that, for such a purpose, heat exchangers of greatly varying types, embedded in the reaction environment (generally a catalytic bed) and crossed internally by an appropriate operating heat exchange fluid, are widely used.

In particular, satisfactory results have been obtained thanks to the use of so-called plate heat exchangers, i.e. consisting of a pair of parallel, generally rectangular metal plates that are spaced apart and perimetrically joined to define an inner chamber intended to be crossed by an operating heat exchange fluid.

Although advantageous from some points of view, such plate exchangers suffer from a recognized drawback; indeed, they do not withstand high pressure differences between the inside and the outside of the exchangers themselves and, when they are subjected to such conditions, they tend to deform and bend. Consequently, there is frequently even a consistent variation in the passage section for the operating fluid with relative consistent variation in the amount of heat exchanged with respect to the design conditions; this means that it is no longer possible to accurately control the pseudo-isothermicity of the reaction, with a consequent reduction in yield of the reaction itself.

SUMMARY OF THE INVENTION

The technical problem underlying the present invention is that of providing a pseudo-isothermal chemical reactor comprising a heat exchange unit having structural and functional characteristics able to overcome the drawbacks quoted with reference to the prior art, in other words a heat exchange unit the heat exchangers of which can withstand even high pressure differences that may occur, on purpose or not, between the inside of the exchangers and the reaction environment in which said unit is operating.

The aforementioned technical problem is solved by a pseudo-isothermal chemical reactor for heterogeneous chemical reactions of the type considered above, characterized in that at least one of said heat exchangers consists of a coil obtained from a single tubular element and has substantially parallelepiped, flattened overall dimensions.

Preferably, said coil heat exchanger comprises a plurality of parallel tubular rectilinear portions, connected together head-to-tail by a corresponding plurality of curvilinear fitting portions.

In particular, said tubular rectilinear portions have the same length and have coplanar longitudinal axes.

Further characteristics and the advantages of the invention will become clearer from the detailed description of an embodiment of a chemical reactor according to the invention, made hereafter with reference to the attached drawings, given for indicating and not limiting purposes.

DETAILED DESCRIPTION OF THE INVENTION

Figure 1:
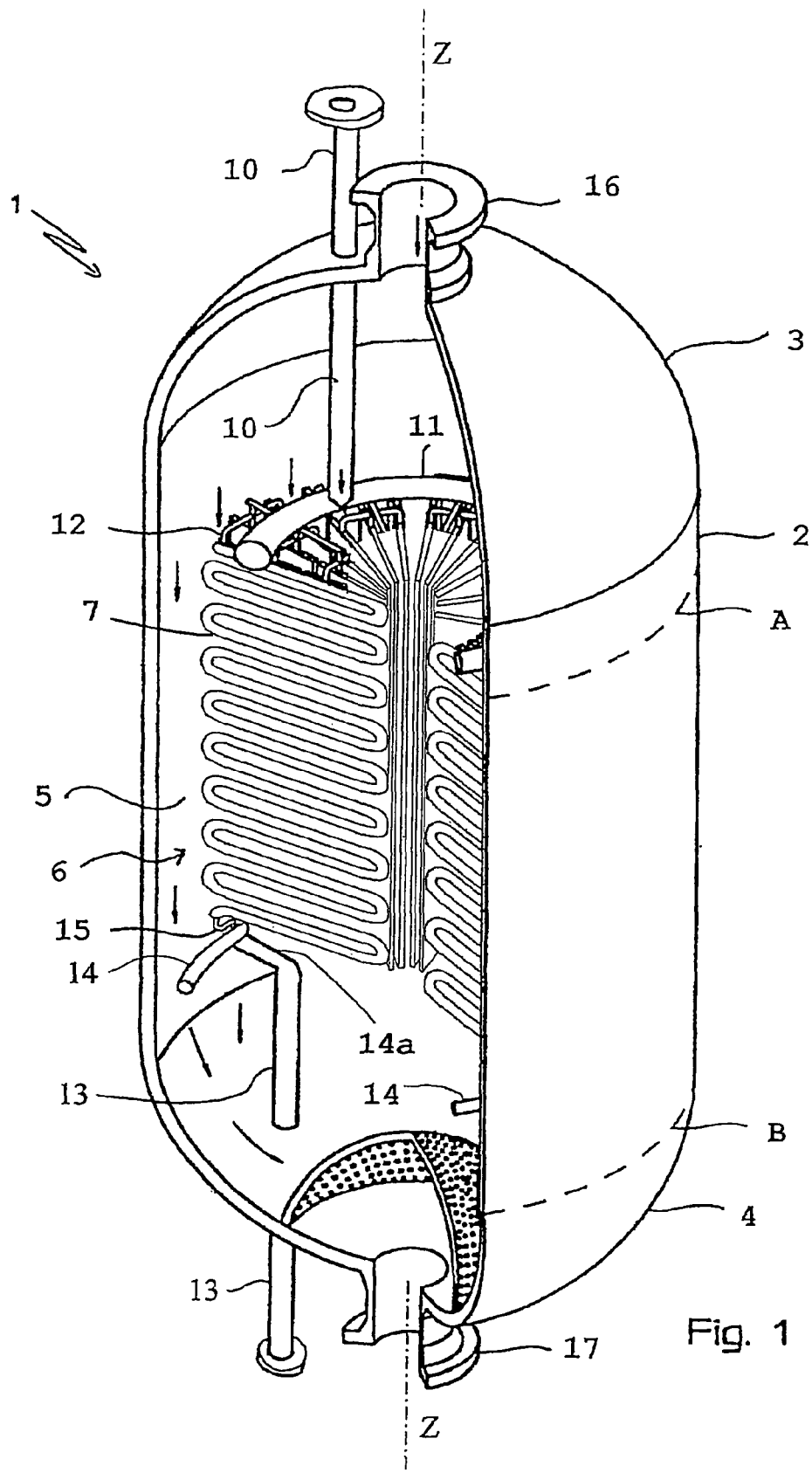
FIG. 1 shows a perspective partial section view of a reactor according to the invention.

With reference to FIG. 1, a pseudo-isothermal chemical reactor according to the present invention is globally indicated with 1.

The reactor 1 comprises a cylindrical shell 2, closed at the opposite ends by respective bottoms, upper 3 and lower 4, respectively equipped with an opening 16, for the inlet for example of gaseous reactants, and a opening 17, for the outlet of the reaction products. In said shell 2 a reaction zone 5 is defined, intended for receiving a catalytic bed (not represented) and in which a heat exchange unit 6, comprising a plurality of heat exchangers 7, is supported conventionally.

Figures 3, 4:
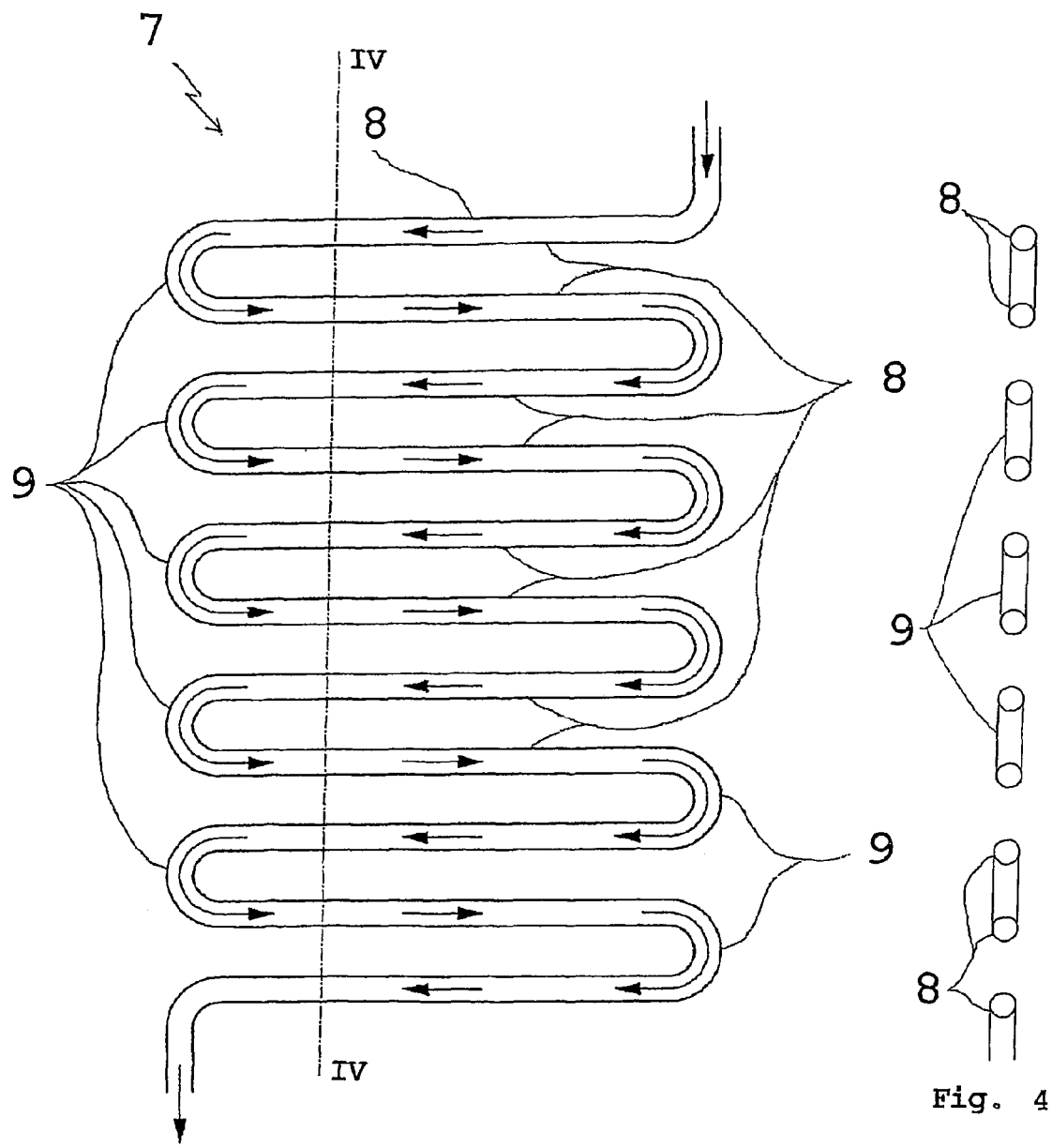
FIG. 3 schematically shows an enlarged scale view of a detail of FIG. 1.
FIG. 4 schematically represents a section view of the detail of FIG. 3 along the line IV-IV.

In accordance with a first characteristic of the present invention, each of said heat exchangers 7 consists (FIG. 3, 4) of a coil obtained from a single tubular element of predetermined diameter and which has a substantially parallelepiped, flattened overall dimensions. Said coil has rectilinear portions 8, all parallel and of equal length, connected together head-to-tail by preferably semicircular curvilinear fitting portions 9. Advantageously, said rectilinear portions 8 are in an equally spaced apart relationship and have coplanar longitudinal axes.

In accordance with another characteristic of the present invention, said coil heat exchangers 7 are arranged in the reaction zone 5, so that the respective rectilinear portions 8 extend radially in the shell 2 and, more precisely, in said reaction zone 5.

Due to the aforementioned arrangement of the heat exchangers 7, the heat exchange unit 6, consisting of them, takes up a substantially cylindrical configuration, coaxial and concentric to the reaction zone 5, in which it is positioned, in said unit 6 the coil heat exchangers 7 being arranged radially.

Figure 2:
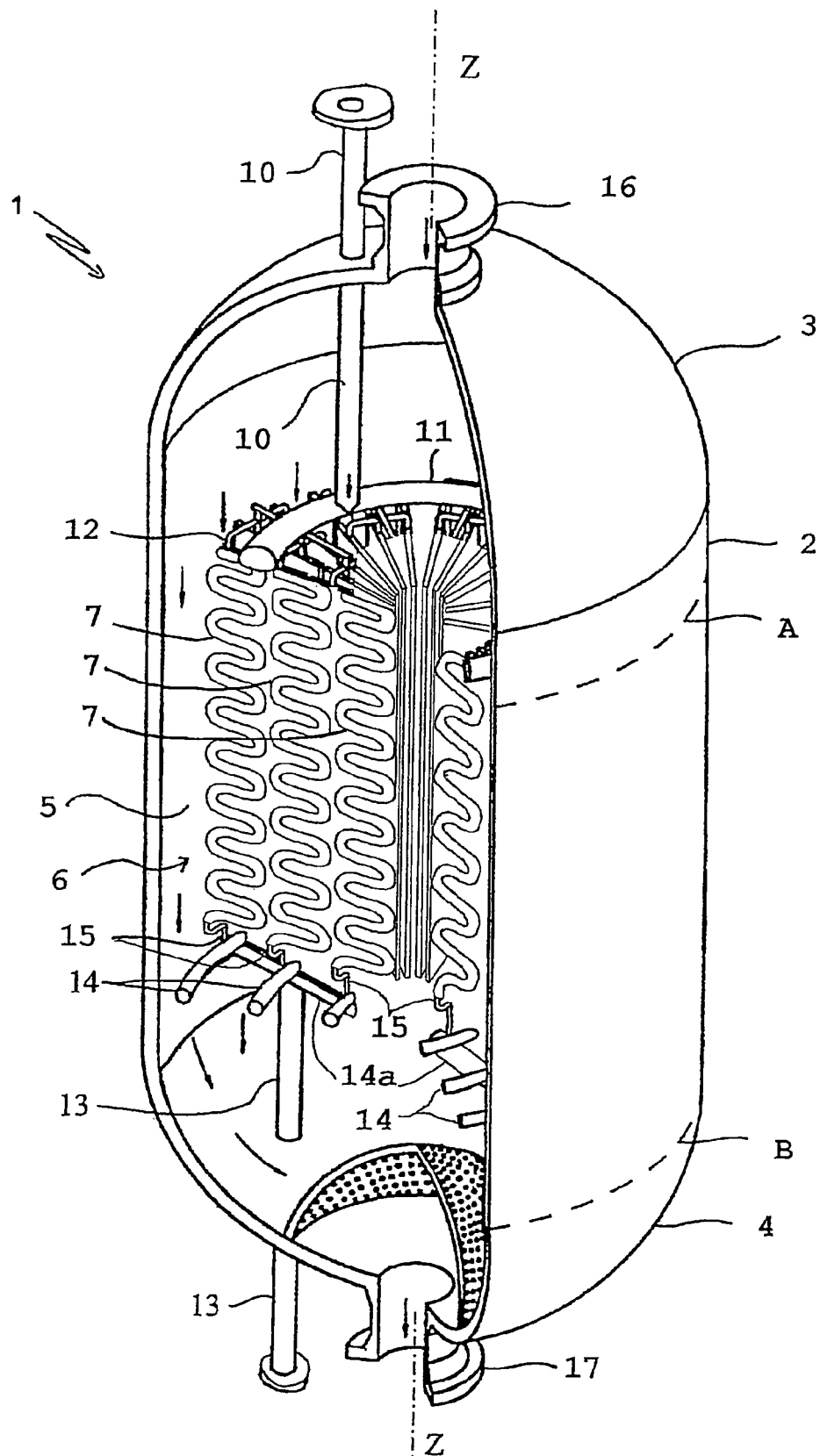
FIG. 2 schematically shows an alternative embodiment of the reactor of FIG. 1.

Advantageously (FIG. 2), according to an alternative embodiment of said heat exchange unit 6, the heat exchangers 7 are always arranged radially, but in many coaxial and concentric arrangements (three in the example), one inside the other.

The tubular coil heat exchangers 7 are intended to be crossed by an appropriate heat exchange fluid. For such a purpose, at the upper bottom 3 of the reactor 1, said exchangers 7 are in fluid communication with the outside of said reactor 1 through respective supply fittings 12, all leading to an annular distributor duct 11, in turn in communication with the outside of the reactor 1 through a supply duct 10, which crosses said upper bottom 3.

At the lower bottom 4 of the reactor 1, the coil heat exchangers 7 are in fluid communication with the outside of the reactor 1 itself, through respective discharge fittings 15, all leading to an annular collector duct 14 (FIG. 1) or to respective annular ducts 14 (FIG. 2), in turn in fluid communication, through the duct 14a, with a discharge duct 13, extending through said lower bottom 4.

Thanks to the configuration described above a pseudo-isothermal chemical reactor is advantageously obtained in which the heat exchangers are able to operate in the presence of large pressure differences between the inside and the outside of the exchanger, keeping, inside the reactor, the same overall dimensions as the plate exchangers of the prior art.

A further advantage is given by the fact that, with the same overall dimensions with respect to the exchangers of the prior art, the exchangers of the preset invention offer a greater heat exchange surface, and thus allow an increased heat exchange between operating fluid and reaction zone.

Figure 5:
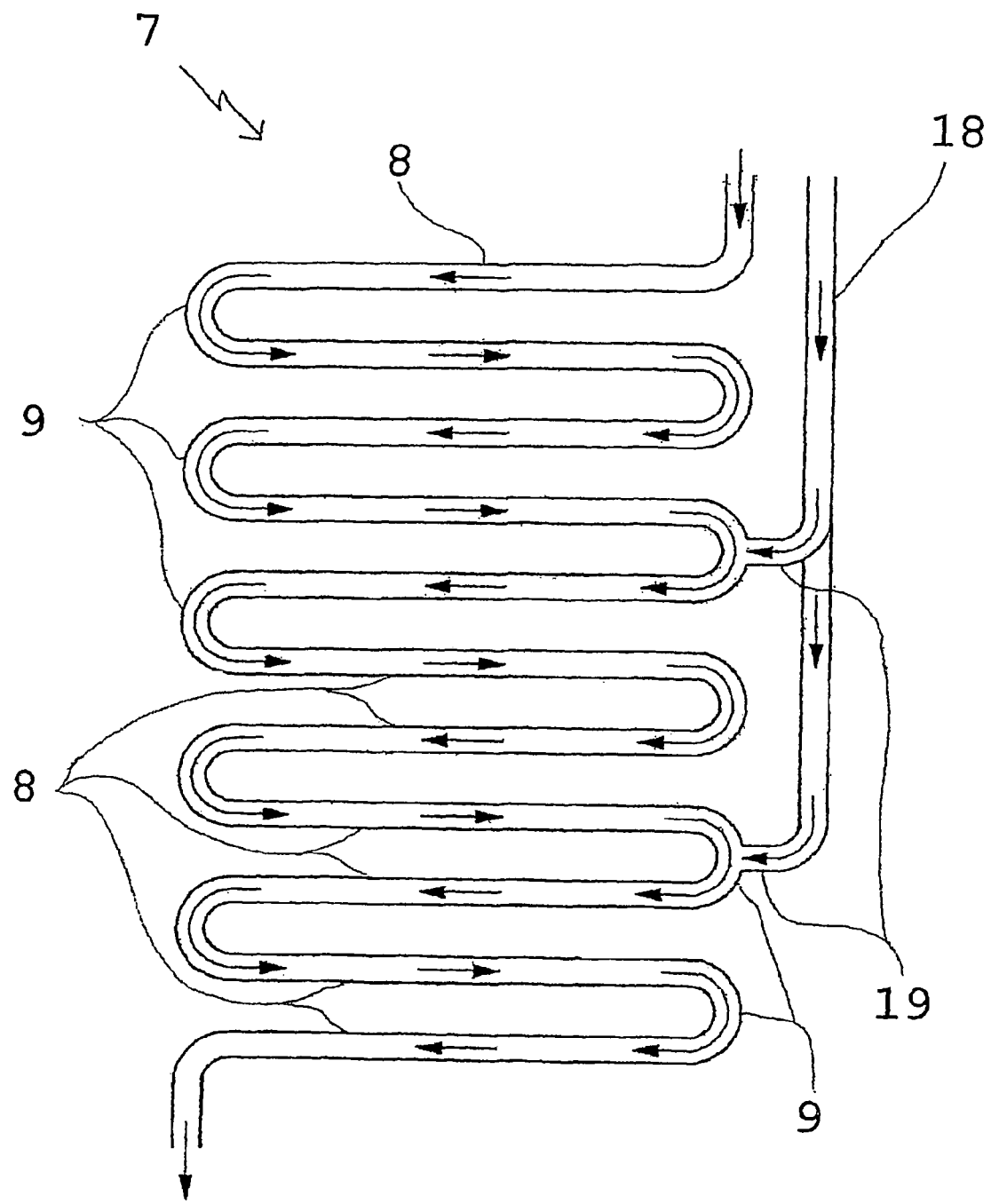
FIG. 5 represents an alternative embodiment of the detail of FIG. 3.

According to a further alternative embodiment of the preset invention, represented in FIG. 5, in each heat exchanger 7 a duct 18 is provided for an additional supply of operating fluid in at least one predetermined intermediate position of the extension of the respective tubular coil. Said duct 18 is associated with the heat exchanger 7, preferably at a curved portion 9. Thanks to this embodiment it is possible to control with greater precision the temperature inside the heat exchangers 7, consequently allowing an improved control of the heat exchanged with the reaction zone 5 and thus of the pseudo-isothermicity of the reaction, obtaining an improved yield.

Figure 6:
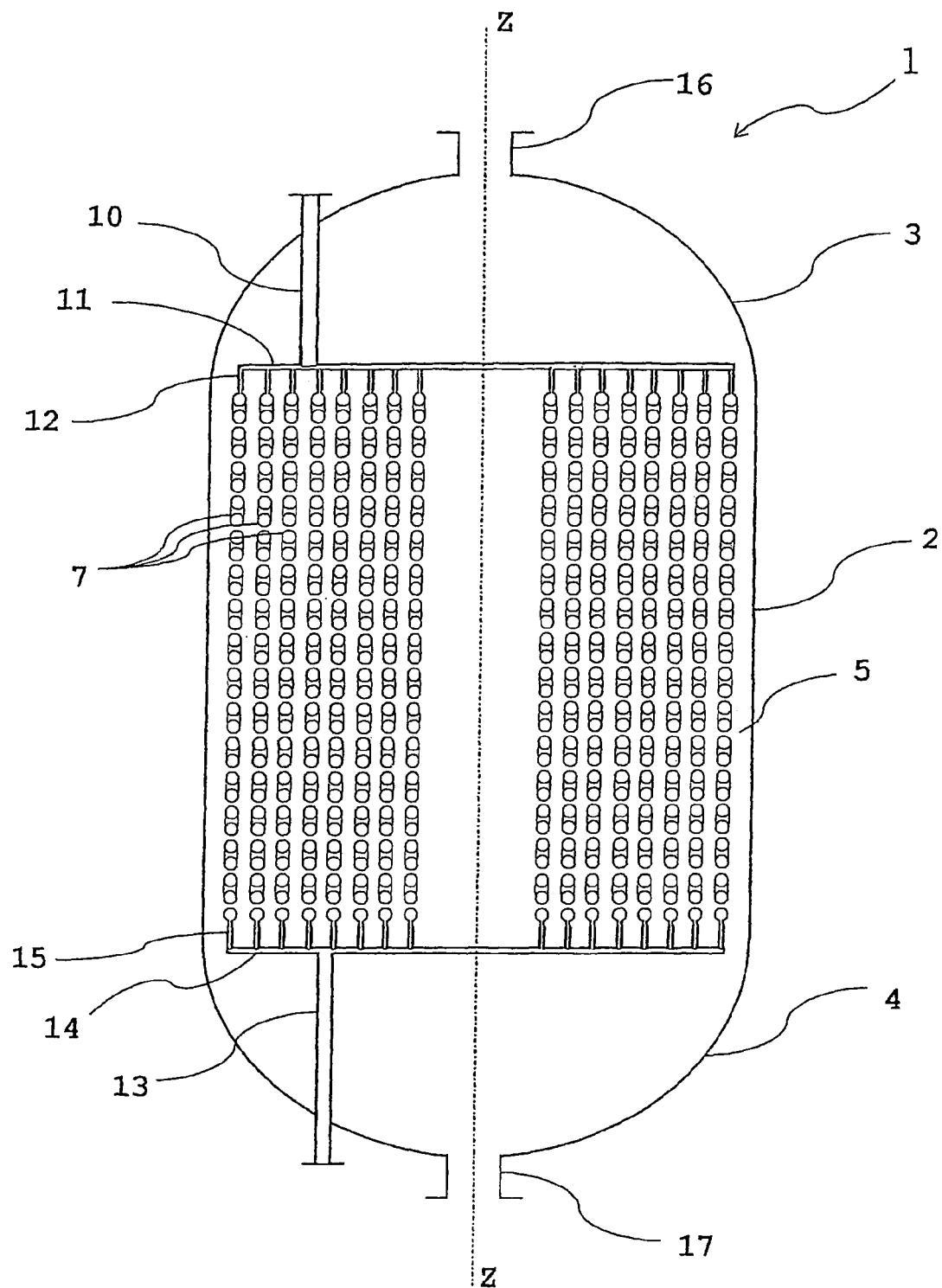
FIG. 6 schematically represents a section view of an alternative embodiment of the reactor of FIG. 1.
Figure 7:
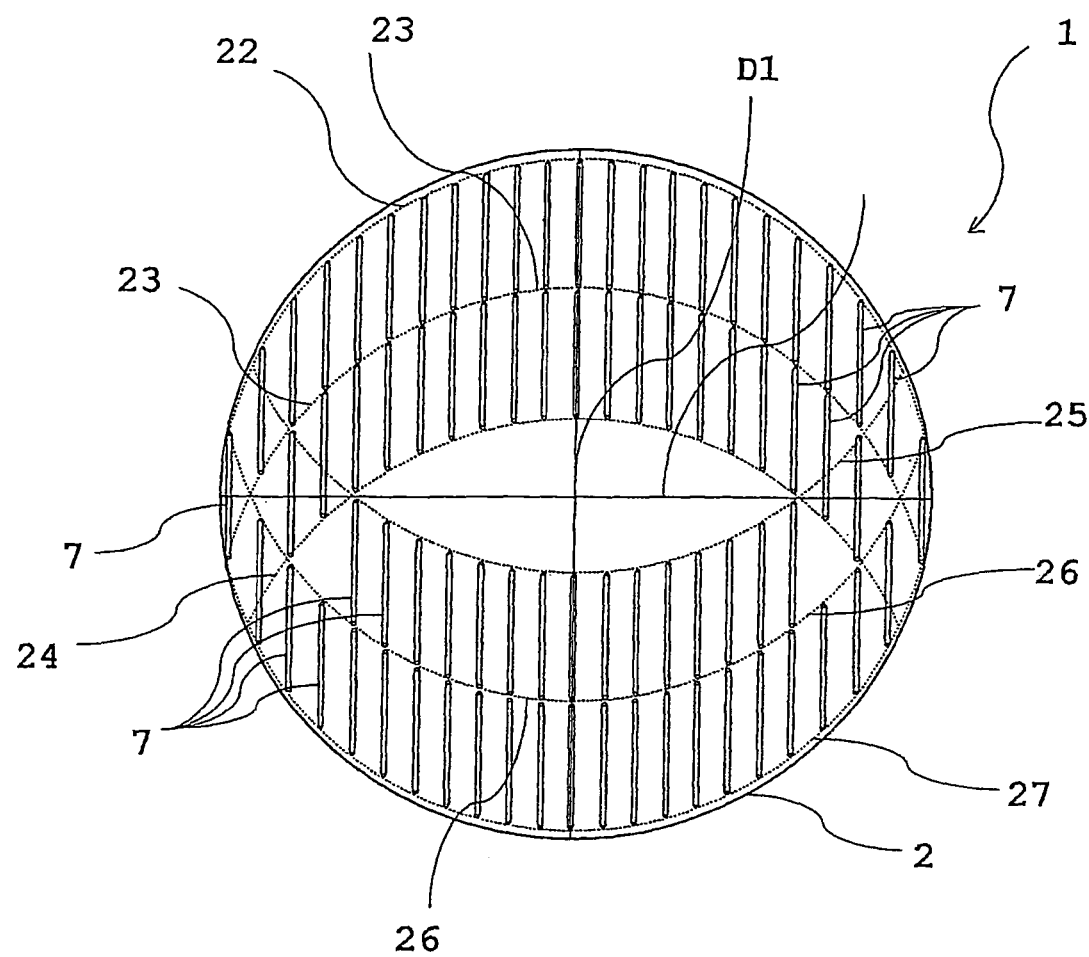
FIG. 7 schematically represents a section view of the alternative embodiment of FIG. 6.

According to an alternative embodiment, the coil exchangers 7 of the preset invention can be arranged in the reaction zone 5, with the respective rectilinear portions 8 extending parallel to a diameter of the shell 2 and not radially as described and represented above (FIGS. 6 and 7).

In such figures, the details of the chemical reactor 1 that are structurally and functionally equivalent to those illustrated in the previous figures shall be indicated with the same reference numerals and shall not be described any further.

According to this embodiment (FIG. 6), the heat exchangers 7 are arranged on imaginary equidistant parallel planes.

Moreover (FIG. 7), the curvilinear fitting portions 9 are tangent to imaginary cylindrical surfaces 22, 23, 24, 25, 26, 27 having the same radius as the inner radius of the shell 2 and centres all arranged on the same diameter D1 of the shell 2.

Thanks to this alternative embodiment it is possible to effectively control the pseudo-isothermicity of a chemical reaction with a high pressure difference between the inside and the outside of the exchangers, using coil heat exchangers 7 all of the same size.

The invention thus conceived can undergo further variants and modifications all of which are covered by the scope of protection of the invention itself.

According to an alternative non-represented embodiment of the present invention, said rectilinear portions 8 of the coil heat exchangers 7 are orientated parallel to the direction of the longitudinal axis Z-Z of the shell 2.

This configuration is generally used when the reactor 1 is designed to be crossed radially by the reactants; thanks to this embodiment, indeed, it is possible to ensure, for the aforementioned use, the pseudo-isothermicity of the reaction along the crossing direction of the reactor by the reactants.

According to a non-represented alternative embodiment of the invention, the distributor duct 11 and the collector duct 14 are arranged on concentric circumferences; in this way the heat exchangers 7, being in communication with said ducts 11 and 14 through the supply 12 and discharge 15 fittings, extend freely and without restrictions in the opposite direction with respect to said ducts 11 and 14.

This advantageously allows it to be avoided to subject the ducts 11 and 14 to mechanical stress when said exchanger 7 undergoes a dilation caused by high temperatures.

The invention claimed is:

1. A pseudo-isothermal chemical reactor for heterogeneous chemical reactions comprising:
    a substantially cylindrical shell having an axis(Z-Z);
    a reaction zone defined in said shell; and
    at least one heat exchange unit, supported in said reaction zone and comprising a plurality of heat exchangers,
    wherein at least one of said heat exchangers consists of a coil obtained from a single tubular element which extends in a serpentine manner substantially in a plane parallel to said axis (Z-Z) of the shell.

2. The chemical reactor according to claim 1, wherein said heat exchanger comprises a plurality of tubular, parallel rectilinear portions connected together head-to-tail by a corresponding plurality of curvilinear fitting portions.

3. The chemical reactor according to claim 2, wherein said tubular rectilinear portions are of equal length and have coplanar longitudinal axes.

4. The chemical reactor according to claim 3, wherein said curvilinear portions are semicircular.

5. The chemical reactor according to claim 3, wherein said rectilinear portions of said coil exchangers extend radially in said reaction zone.

6. The chemical reactor according to claim 3, wherein said rectilinear portions of said coil exchangers extend in said reaction zone substantially parallel to the axis (Z-Z) of the shell.

7. The chemical reactor according to claim 1, wherein said heat exchange unit comprising a plurality of said coil heat exchangers has a substantially cylindrical configuration, coaxial and concentric to said reaction zone, in which it is supported, the coil heat exchangers being arranged radially in said heat exchange unit.

8. The chemical reactor according to claim 7, wherein, the coil heat exchangers are arranged radially in said heat exchange unit in many coaxial and concentric arrangements.

9. The chemical reactor according to claim 1, wherein at least one of said coil heat exchangers comprises an additional duct supplying operating heat exchange fluid, associated with the exchanger itself in a predetermined intermediate position of the respective coil.

10. The chemical reactor according to claim 3, wherein said rectilinear portions of said coil exchangers extend parallel to a diameter of the shell.

11. The chemical reactor according to claim 10, wherein said coil exchangers are arranged on imaginary equidistant parallel planes.

12. The chemical reactor according to claim 11, wherein said curvilinear fitting portions are tangent to imaginary cylindrical surfaces having a radius equal to the inner radius of the shell and centres all arranged on the same diameter of the shell.

* * * * *